US008376241B2

(12) United States Patent
Green et al.

(10) Patent No.: US 8,376,241 B2
(45) Date of Patent: Feb. 19, 2013

(54) TEMPERATURE LIMITING DEVICE APPLICABLE TO SINGLE LEVER VALVES FOR MIXING HOT AND COLD LIQUIDS

(75) Inventors: John William Green, Hamilton (NZ); Ian Moran, Hamilton (NZ)

(73) Assignee: Greens Industries Limited, Hamilton (NZ)

( * ) Notice: Subject to any disclaimer, the term of this patent is extended or adjusted under 35 U.S.C. 154(b) by 709 days.

(21) Appl. No.: 10/573,417

(22) PCT Filed: Sep. 21, 2004

(86) PCT No.: PCT/NZ2004/000225
§ 371 (c)(1),
(2), (4) Date: Mar. 27, 2006

(87) PCT Pub. No.: WO2005/028930
PCT Pub. Date: Mar. 31, 2005

(65) Prior Publication Data
US 2008/0121282 A1 May 29, 2008

(30) Foreign Application Priority Data

Sep. 25, 2003 (NZ) ........................................ 528442

(51) Int. Cl.
*G05D 23/13* (2006.01)
*G05D 23/275* (2006.01)
(52) U.S. Cl. ................ 236/12.11; 236/12.21; 236/12.23
(58) Field of Classification Search .................. 236/12.2, 236/12.11, 12.23, 12.21
See application file for complete search history.

(56) References Cited

U.S. PATENT DOCUMENTS

| 841,817 | A | * | 1/1907 | Ricketts ......................... 236/12.2 |
|---|---|---|---|---|
| 2,250,815 | A | * | 7/1941 | Ruegg et al. .................. 236/12.2 |
| 2,526,099 | A | * | 10/1950 | Vinson .......................... 236/12.2 |
| 2,950,055 | A | * | 8/1960 | Algino et al. .................. 236/12.2 |
| 2,951,641 | A | * | 9/1960 | Kovach et al. ................ 236/12.2 |
| 3,028,094 | A | * | 4/1962 | Burhop ......................... 236/12.2 |
| 3,929,283 | A | | 12/1975 | Delpla ............................. 236/12 |
| 4,610,393 | A | | 9/1986 | Rodriguez ....................... 236/12 |
| 4,760,953 | A | * | 8/1988 | Trubert ......................... 236/12.2 |
| 5,934,552 | A | * | 8/1999 | Kalbacher et al. ............ 236/12.2 |
| 5,960,828 | A | * | 10/1999 | Grohe et al. .................. 137/607 |
| 6,079,625 | A | * | 6/2000 | Lebkuchner .................. 236/12.2 |
| 6,257,493 | B1 | * | 7/2001 | Chamot et al. ............. 236/12.13 |
| 6,517,006 | B1 | | 2/2003 | Knapp ............................. 236/12 |
| 7,717,351 | B2 | * | 5/2010 | Kline ........................ 236/12.18 |
| 8,020,779 | B2 | * | 9/2011 | Jarvis ......................... 236/12.11 |
| 2003/0197065 | A1 | * | 10/2003 | Graves ......................... 236/12.2 |
| 2003/0234295 | A1 | * | 12/2003 | Mace et al. .................. 236/12.2 |

FOREIGN PATENT DOCUMENTS

| EP | 0611260 A1 | 8/2004 |
|---|---|---|
| WO | WO 00/68754 | 11/2000 |

* cited by examiner

*Primary Examiner* — Judy Swann
*Assistant Examiner* — Alexis Cox
(74) *Attorney, Agent, or Firm* — Jacobson Holman PLLC (57) ABSTRACT

A single lever valve for mixing hot and cold liquids has a mixer which can internally impose an upper limit on the temperature of any liquid emerging from it. The means used may enable the upper limit to be changed by exchange of a component so that the mixer can be used in any location in an installation even though different locations might have different upper limit requirements. The mixer may take the form of a cartridge able to be exchanged with an existing cartridge to convert an "unsafe" mixer to a "safe" one.

30 Claims, 5 Drawing Sheets

TEMPERATURE LIMITING DEVICE APPLICABLE TO SINGLE LEVER VALVES FOR MIXING HOT AND COLD LIQUIDS

This is a nationalization of PCT/NZ2004/000225 filed 21 Sep. 2004 and published in English.

This invention concerns a device which is applicable to a single lever mixing valve, such as a tap or faucet. It may take the form of a cartridge for such a valve or it may be incorporated as an integral part of the valve.

CONTENTS

Definitions applicable to the description and claims

BACKGROUND

Introduction and problems
How prior art 3-port single lever mixing valves work—FIG. 1
Disadvantages of the above types of valve and solutions required
Temperature sensing devices
Known means of avoiding the disadvantages of 3-port mixers
Modes of carrying out the invention
Device with temperature sensing device located in the body—FIG. 2
Device with temperature sensing device located in the stationary distributing member—FIG. 3
Device with temperature sensing device located in the movable distributing member—FIG. 4
Best mode of carrying out the invention: Ceramic-disc cartridge with temperature sensing device in body—FIGS. 5-9
Devices with cylindrical movable distributing members—FIG. 10,11.
Advantages
Statements of invention
Drawing references
Claims
Abstract Definitions applicable to the description and claims The words "upper" and "lower" or related spatial variations are used purely to facilitate an understanding of the invention, as they reflect the usual orientation of the device, or parts of the device, when used as, say, a water control valve for a single lever tap or faucet fitted to a hand-basin where the lever operating the valve will be uppermost. The words are not to be construed as limiting the invention when the view is in some other orientation.

The term "cartridge" is intended to refer to an assembly of parts which can be inserted as a whole into the body of a single lever mixing valve or can be removed as a whole. Accordingly the cartridge will usually have various mechanical components and various orifices which will mate with those of the valve and perhaps with those of another cartridge or cartridges in the valve.

For example ceramic disc valves frequently have the discs contained within a replaceable cylindrical cartridge.

The terms "full hot", or other lever position, in this specification and the claims is refer to the lever position as if the valve were a conventional three port valve.

"Distributing members" refer to the essential components which direct the flow path and the outlet volume of flow (if any) of any liquid or liquids fed to them and allow complete closure of all outlet flow. Typically they may be ceramic discs.

"Communicates" means that there is a path for liquid, or there is capacity for a path for liquid, as the context requires.

"Too hot" means that the temperature of the hot liquid feed to the device exceeds the maximum outlet liquid temperature which the device should deliver.

BACKGROUND

Introduction and Problems

There are many situations where the mixing of hot and cold liquids is effected via a single lever mixing valve or mixer. Some may contain a cartridge, others may not. Some may have a movable distributing member which may loosely be termed "spherical", although only a portion would have a spherical surface. Other movable distributing members may be loosely termed "cylindrical" or "flat". "Flat" movable distributing members are usually ceramic, usually disc-shaped, and operate in conjunction with a stationary distributing member which is also ceramic and flat as opposed to cupped. Regardless of the form of the distributing members this type of mixer can allow dangerously hot liquid to be fed from it. In the typical situation where the liquids are water in a domestic supply, there is a minimum desirable temperature of any stored hot water fed to such a mixer. With water stored in bulk the storage temperature should exceed 61° C. to avoid contamination with Legionnaires disease. The problem is that water even at 61° C. is at too high a temperature for the human body to contact safely for long. Where the water is not stored but heated in response to draw-off demand there may be no problem if the heat input is restricted so the inflow is supplied at a satisfactory lower temperature—that is until the heat control malfunctions. Similarly while it is well known to have a tempering valve on a bulk supply of hot water so that the hot feed from it is diluted with cold water to give a mixed flow with a temperature lower than the storage temperature, that too may only be satisfactory while the tempering valve does not malfunction and while the heat input control also does not malfunction. A typical problem could be loss of cold water pressure.

How Prior Art 3-Port Single Lever Mixing Valves Work—FIG. 1

Figure 1:
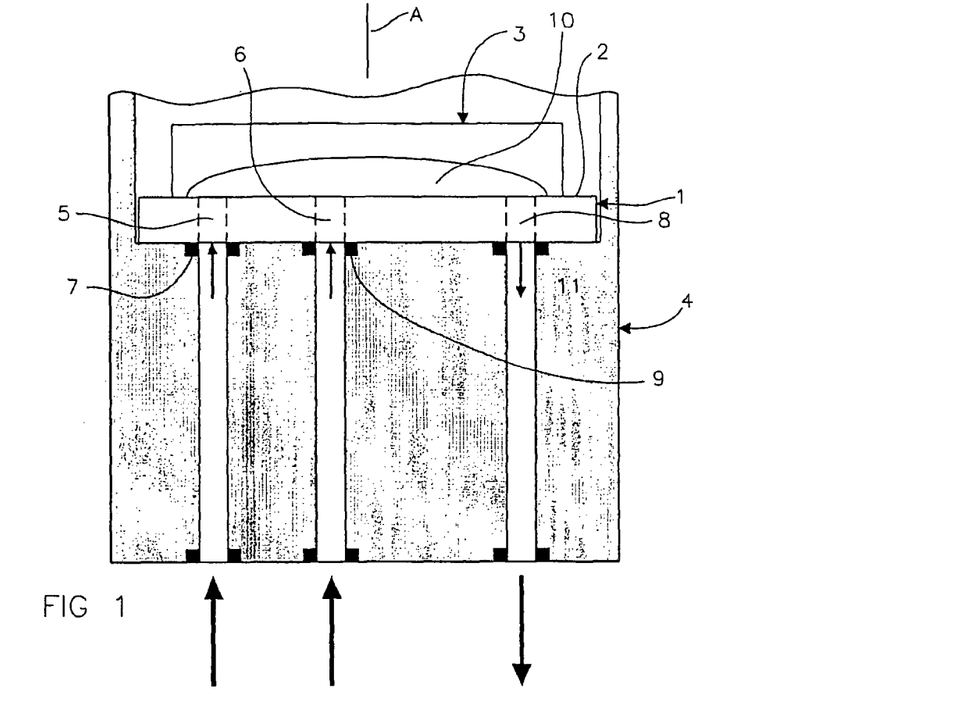

In order to facilitate an understanding of how the device of the present invention differs from the prior art single lever mixing valves or cartridges incorporating movable distributing members and stationary distributing members discussion of a typical prior art ceramic disc-type construction now follows with reference to FIG. 1 which is entirely schematic.

A prior art single lever mixing valve has a stationary lower distributing member 1 with a flat upper sealing portion 2 and a movable upper distributing member 3 which has a flat lower sealing portion (not shown). The function of the distributing members is to progressively open and close two input feeds to and from a combined output flow and to keep the input feeds closed from each other when there is to be no output flow.

The movable and stationary distributing members are suitably supported in a body 4 which may be a cartridge body or the body of an entire valve. From suitable supply sources hot and cold liquids are separately fed through the body to separate hot and cold inlet ports such as 5,6 through the lower distributing member 1.

The upper distributing member 3 is able to be rotated to a degree (about 35°-100° is common in the prior art) about an axis such as A, or one parallel to it, which is substantially perpendicular to the plane of the flat sealing portion 2 of the lower distributing member 1, to control the proportions of hot and cold liquids passing through the ports; and also is able to be slid transversely across the lower distributing member 1 to control the flow rates; all the while the flat sealing portions, or parts thereof, maintaining sealing contact. In one position, or sometimes several positions, of the upper distributing member is there is complete shut-off of possible liquid flow out of the valve or cartridge. Sealing contact is provided by the trueness or flatness of the coacting sealing portions which are held pressed together by the pressure of the liquid feed trying to displace the stationary distributing member axially towards the movable distributing member which is restrained against axial movement. "O"-ring seals such as 7 and 9 allow slight axial movement of the stationary distributing member with respect to the body 4 while still maintaining relative sealing. Ports 5 and 6 pass right through the stationary distributing member and communicate with a mixing space 10, usually a cavity wholly contained within the movable distributing member, where mixing of hot and cold liquids occurs and thence the mixture flows out from the valve via port 8 which passes right through the stationary distributing member. The axis A would usually be upright on installation of the valve, with the movable distributing member above the stationary distributing member.

In the usual arrangement, at all times the mixing space and outlet would be in communication to some extent regardless of the lift position of the lever. But when the lever is fully depressed the mixing space is sealed off from the inlet ports 5,6.

The above description would encompass many of the known types of 3-port single lever mixing valves as commonly used for domestic hot and cold water regulation for baths, hand-basins and sink-basins.

Disadvantages of the Above Types of Valve and Solutions Required

The above types of valve may be quite adequate when used with a hot liquid supply whose flow ceases if the cold liquid flow ceases and whose temperature can never exceed a safe upper limit because of the use of a reliable tempering valve or similar on the bulk supply. Typically a mains pressure supplied hot water cylinder will cease to feed hot water if the cold mains pressure water supply to it stops.

However, the above type of valve has no means of limiting the maximum temperature of the liquid emerging from it and that is the problem the present is invention seeks to solve. The prior art valve could never be considered to be fail-safe but that is what is required.

The solution which the present invention seeks to provide is to supply a means whereby the mixer can internally impose an upper limit on the zo temperature of any liquid emerging from it. The means would preferably enable the upper limit to be changed by exchange or selection of a component so that the mixer could be used in any location in an installation even though different locations might have different upper limit requirements while having the same temperature of hot liquid input. It would preferably take the form of a cartridge able to be exchanged with an existing cartridge to convert an "unsafe" mixer to a "safe" one.

Temperature Sensing Devices

The exchangeable or selectable component of the device of the present invention is a temperature sensing device. The temperature sensing device must be capable of an externally sensible movement, such as a lengthwise expansion, when subjected to increasing temperature. It must move back on cooling. The housing or body of the temperature sensing device may be of any suitable shape but will usually be elongated and will usually be mostly cylindrical. The temperature sensing device may function rather like an hydraulic ram, with a piston which is movable in and out from the housing of the device (usually sealingly movable). However, the motive force in such a case is not hydraulic fluid but may arise, at least in part, from the volumetric change of a suitable flowable substance contained within the housing, when the substance is heated or cooled. Another means of providing motive force is the use of bimetallic discs within the housing, which cup on heating. The force so generated is used to move the piston either by direct pressure on it within the housing, or via a resilient means, such as a compression spring, within the housing, and there may be external resilient forces acting on the piston outside the housing. Thus heat elongation may be the result of direct pressure on the end of the piston inside a very conductive housing (eg a copper fluted housing) from an expanded flowable substance (usually a wax and a conductive medium such as copper particles) within the housing, expanding into the space it causes the piston to vacate. Such an expansion force might be partially countered by a resilient force, such as a compression spring within or outside the housing, which will serve to assist withdrawal of the piston back into the housing as the substance is cooled. A more recent development is the use of "shape memory" alloys containing nickel and titanium.

Another form of temperature sensing device might be a suitable flowable substance contained in a flexible bag constrained by a supporting, possibly upright cylindrical, grid to allow an upper or lower surface, or both, to move axially in response to temperature change. There is thus no piston or housing with such a temperature sensing device.

All types of temperature sensing device with any means of providing a sensible or detectable movement with a utilisable resultant motive force are intended to be within the scope of the present invention. The precise means causing the temperature sensing device to operate in the required fashion is not crucial. There may be many variants and performance characteristics from which those skilled in the art may select according to the functions required of the device. Some of the characteristics which will usually be important are the response time after a temperature change, the motive force capable of being developed, impedance to flow if a liquid is to flow through the device as opposed to around it and reproducibility of an extension at the same temperature including whether there is any hysteresis. The location of the temperature sensing portion of the temperature sensing device would be another criterion as would be the overall size.

Known Means of Avoiding the Disadvantages of 3-Port Mixers

The closest known prior art is U.S. Pat. No. 6,257,493 and others in its family.

The teaching of specification U.S. Pat. No. 6,257,493, however, provides no useful solution. Its teaching connects the outlet of a single lever mixing valve with the cold liquid inlet via a piston-type temperature sensing device. Only a mechanical seal, reliant on sustained spring biasing against the unbalanced liquid pressures, stops cold liquid leakage into the outlet. Such a construction would never be reliable in practice.

MODES OF CARRYING OUT THE INVENTION

The device of the present invention utilises a temperature sensing device which in theory can be situated in any of three components of the device—in the body (normal position), in the movable distributing member (difficult), or in the stationary distributing member. There may be differences in the number of essential ports provided through at least part of the stationary distributing member, depending on the location of the temperature sensing device.

Device with the Temperature Sensing Device Located in the Body—FIG. 2

In this example five essential ports are provided through the stationary distributing member as will now be explained with reference to FIG. 2 which is entirely schematic. and which shows the arrangement where the distributing members, may be of any suitable shape, while the temperature sensing device is located in the body of the device.

Figure 2:
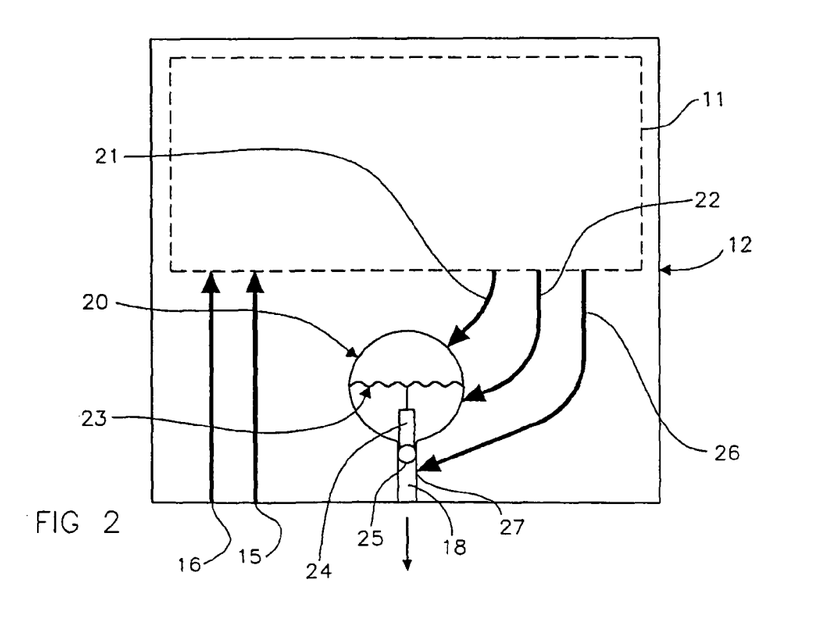

In FIG. 2 the dotted outline 11 represents the distributing members, the stationary distributing member being lowermost, and the full outline represents the body 12 of the device whether it be the body of a valve or a cartridge for a valve. The cold liquid may enter the stationary distributing member through a port represented by the head of arrow 16 but the porting of the movable distributing member is such that cold liquid can never mingle with hot liquid in the distributing members. Instead hot liquid may enter the stationary distributing member through a port represented by the head of arrow 15. The hot liquid is separately directed via a path represented by arrow 21 to a convergence space 20 which is within the body 12. The tail of the arrow would coincide with a port in the stationary distributing member. There is an outlet 18 from the convergence space 20.

The cold liquid is separately directed via a path represented by arrow 22 to the convergence space 20. The tail of the arrow would coincide with a port in the stationary distributing member. Within the convergence space 20 is a flow regulating means 23 capable of regulating the flow of hot and cold liquids entering the convergence space by progressively opening the hot liquid inflow while progressively closing the cold liquid inflow and vice versa and capable of effecting complete closure of the hot liquid inflow. At the designed temperature range of the incoming hot liquid a temperature sensing device, 24 assumes a regulatory role in controlling the operation of the flow regulating means 23 which usually allows some introduction of cold liquid to be mixed with, and thus to cool, the hot liquid stream to the desired extent, if it needs cooling. The temperature sensing device 24 may be partially located in the convergence space 20 (where mixing of liquids can occur if permitted by the flow regulating means 23) but at least a temperature sensing portion 25 of it is located in the outlet 11. The outlet could be contiguous with the convergence space where the hot and cold inflows have mingled. It does not necessarily need to be a passage as illustrated although at least part of the outlet usually will be. The aim is to have it located where it will sense the temperatures of the mixed liquids, not unmixed, and where there is good flow around it for accurate sensing.

A second supply of cold liquid goes to the outlet 18 and is indicated by arrow 26. The tail of the arrow would correspond with a port in the stationary distributing member. Communication with the outlet 18 is at a location such as 27 substantially downstream of the temperature sensing portion 25, in preference. This second means of possible entry of cold liquid, into the emergent stream in the outlet 18, allows cooling of the automatically mixed liquids which were at a pre-determined maximum temperature. It will be referred to as manual-control entry. It enables the "safe" mixed liquids to be further cooled should the application require that.

Thus when the device is on "full hot" the emergent stream can never be hotter, other than for a short response time, than the pre-determined safe temperature. If there is inadequate cold liquid available via supply 22 the flow regulating means 23 closes the hot liquid supply completely until adequate cold flow resumes. Otherwise the device acts to allow cooler (than the pre-set) temperatures of mixed liquids to be supplied at rates controlled by the lever position. Importantly one of the lever positions enables the movable distributing member to assume a position with respect to the stationary distributing member where the hot liquid inlet supply 15 and the cold liquid supply 16 do not communicate with each other and communication is also blocked from any of the outlet supplies represented by arrows 21, 22 and 26. The temperature sensing device thus does not form any part of the means whereby liquid communication through the device is totally closed off (which usually requires the lever to be in the depressed position).

Device with the Temperature Sensing Device Located in the Stationary Distributing Member—FIG. 3

In this example two essential ports are provided through the stationary distributing member (the outlet goes into or out from the stationary distributing member but not through it) as will now be explained with reference to FIG. 3 which is entirely schematic and which shows the arrangement where the distributing members, may be of any suitable shape, while the temperature sensing device is located in the stationary distributing member. The same references used in FIG. 2 are used in FIG. 3 to indicate corresponding items.

Figure 3:
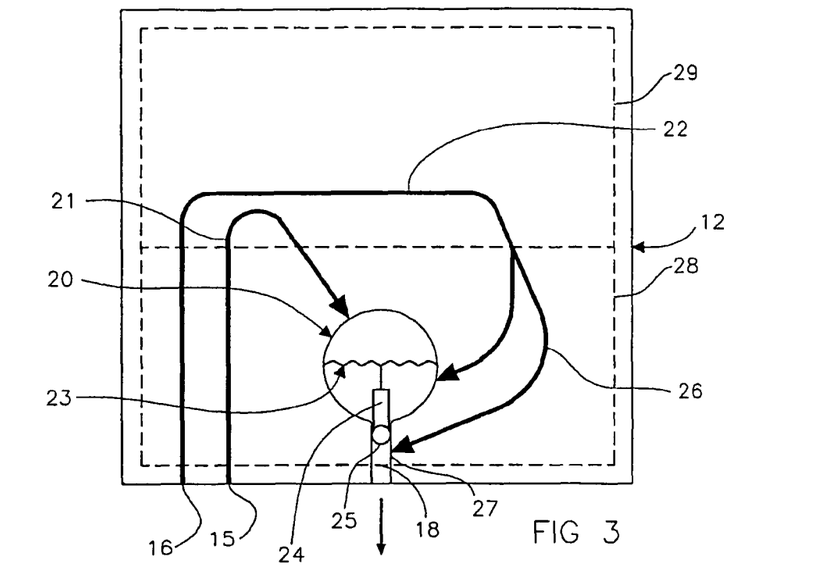

In FIG. 3 the dotted outline 28 represents the stationary distributing member and the dotted outline 29 represents the movable distributing member. The full outline represents the body 12 of the device whether it be the body of a valve or a cartridge for a valve. The cold liquid may enter the stationary distributing member through a port represented by the head of arrow 16 and again the porting of the movable distributing member 29 is such that cold to liquid can never mingle with hot liquid in the distributing members. Instead hot liquid may enter the stationary distributing member through a port represented by the head of arrow 15. The hot liquid is separately directed via a path represented by arrow 21 to a convergence space 20 which is within the stationary distributing member 28. There is an outlet 18 from the convergence space 20.

The cold liquid is separately directed via a path represented by arrow 22 to the convergence space 20. Within the convergence space 20 is a flow regulating means 23 and a temperature sensing device with a temperature sensing portion are also provided and function as described above.

The second supply of cold liquid goes to the outlet 18 and is indicated by arrow 26. The tail of the arrow would correspond with an access to the movable distributing member which has access to the cold liquid feed.

Importantly one of the lever positions enables the movable distributing member 29 to assume a position with respect to the stationary distributing member 28 where the hot liquid path 21 and the cold liquid path 22 do not communicate with each other the paths being blocked off once, or perhaps twice, where the movable distributing member and stationary distributing member sealingly coact. Communication is also blocked at the junction to close off the path represented by arrow 26. The temperature sensing device thus does not form any part of the means whereby liquid communication through the device is totally closed off.

Device with the Temperature Sensing Device Located in the Movable Distributing Member—FIG. 4

In this example three essential ports are provided through the stationary distributing member as will now be explained with reference to FIG. 4 which is entirely schematic and which shows the arrangement where the distributing members, may be of any suitable shape, while the temperature sensing device is located in the movable distributing member. The same references used in FIG. 3 are used in FIG. 4 to indicate corresponding items.

Figure 4:
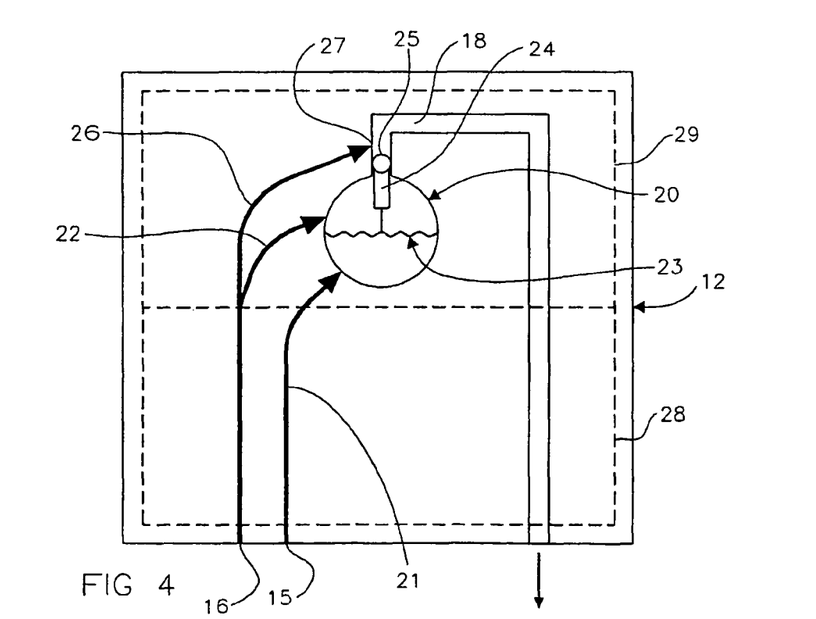

In FIG. 4 the dotted outline 28 represents the stationary distributing member and the dotted outline 29 represents the movable distributing member. The full outline represents the body 12 of the device whether it be the body of a valve or a cartridge for a valve. The cold liquid may enter the stationary distributing member through a port represented by the head of arrow 16 and again the porting of the movable distributing member 29 is such that cold liquid can never mingle with hot liquid in the distributing members. Instead hot liquid may enter the stationary distributing member through a port represented by the head of arrow 15. The hot liquid is separately directed via a path represented by arrow 21 to a convergence space 20 which is within the movable distributing member 28. There is an outlet 18 from the convergence space 20.

The cold liquid is separately directed via a path represented by arrow 22 to the convergence space 20. Within the convergence space 20 is a flow regulating means 23 and a temperature sensing device with a temperature sensing portion are also provided and function as described above.

The second supply of cold liquid goes to the outlet 18 and is indicated by arrow 26. The tail of the arrow would correspond with an access to the stationary distributing member which has access to the cold liquid feed.

Importantly one of the lever positions enable's the movable distributing member 29 to assume a position with respect to the stationary distributing member 28 where the hot liquid path 21 and the cold liquid path 22 do not communicate with each other the paths being blocked off at the junction where the movable distributing member and stationary distributing member sealingly coact. Communication is also blocked at the junction to close off the path represented by arrow 26. The temperature sensing device thus does not form any part of the means whereby liquid communication through the device is totally closed off.

Best Mode of Carrying Out the Invention: Ceramic Disc Cartridge with Temperature Sensing Device in Body—FIGS. 5-9

From the above description it will be appreciated that this arrangement requires five ports through the stationary distributing member. In the drawings:

In FIG. 5 upper (movable) and lower (stationary) distributing members are schematically represented by two discs 31 and 32 with no detail shown; The arrow represents the liquid outflow.

FIG. 6 shows the wide open "full hot" position where the maximum temperature of the mixed liquids emergent from the cartridge is automatically controlled to within a range about a pre-set temperature when the present invention is utilised.

In the drawings various partitions between components to allow assembly and disassembly are not shown.

Figure 5:
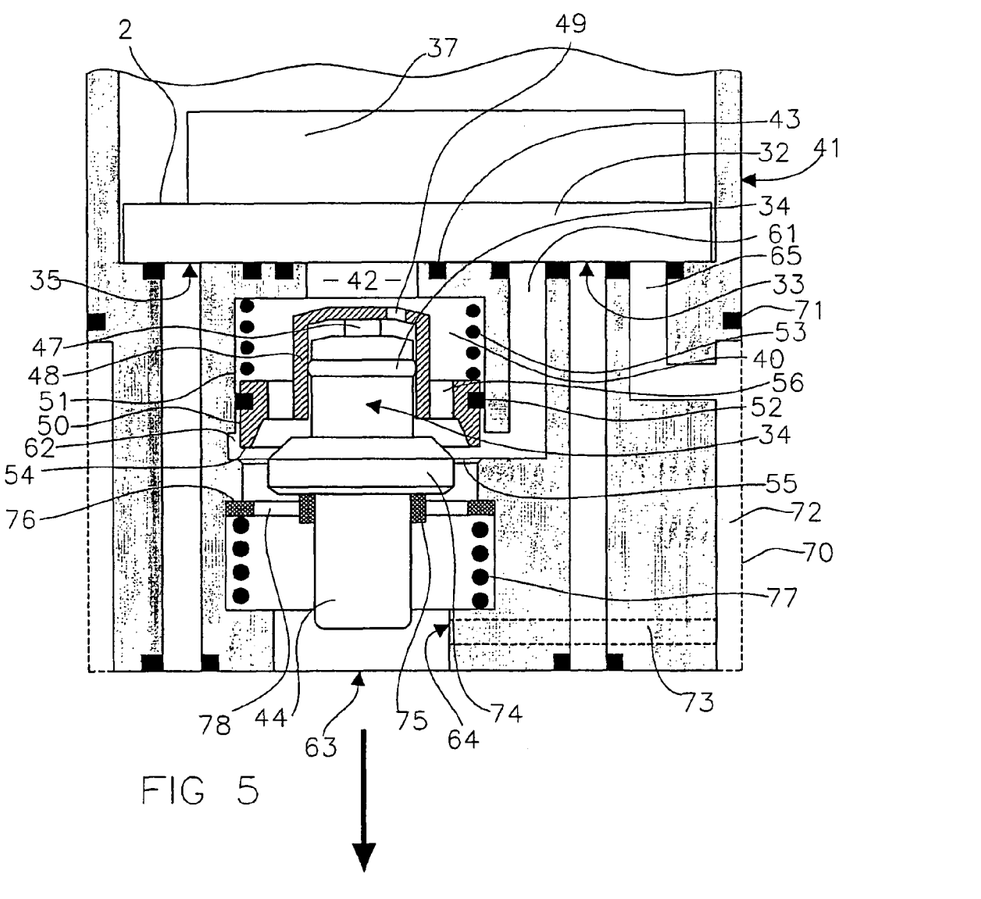
FIG. 5 shows a schematic representation of a cartridge according to the present invention.
Figure 6:
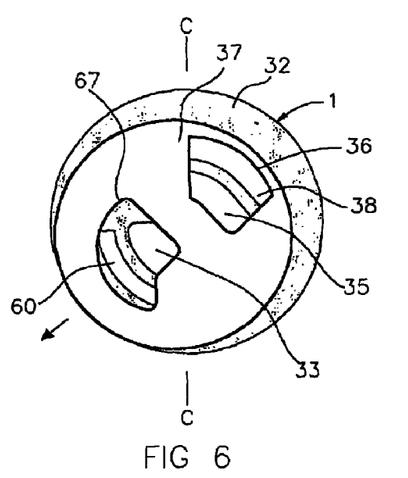
FIG. 6 is the first of a sequence of four figures all showing schematically an overlay of the upper distributing member upon the lower distributing member, the upper sealing surface of which is shown shaded to better illustrate the features to be described. Apertures in the upper distributing member are shown penetrating the whole thickness to represent cold and hot liquid transfer cavities but in practice they would not usually be complete penetrations—they would be mere recesses in the lower sealing surface of the upper distributing member. Similarly the ports shown in the lower distributing member might not be complete penetrations of the shapes drawn but could have penetrations (perhaps circular) of sufficient area communicating with recesses in the upper sealing surface, the combination forming the "port". The line C-C represents the central position of swing of the usual operating handle for the valve (not shown) while the arrow indicates the handle position assumed with the illustrated arrangement of the upper movable distributing member with respect to the stationary lower distributing member.

The cold liquid entering the lower distributing member 32 through port 33 can never mingle uncontrollably with hot liquid upstream of the temperature sensing device 34 where the cold liquid and hot liquid pressures are equal, which is the desirable situation. There are two normal entries for cold liquid into the hot liquid stream.

Hot liquid is fed to the lower distributing member inlet port 35 and thence via a hot liquid recess 36 in the upper distributing member 37 to a hot liquid outlet port 38, when the valve is open. The temperature sensing device 34, assumes a regulatory role controlling a flow regulating means which usually allows some introduction of cold liquid through a first or "automatic" feed to cool the hot liquid stream to the desired extent, if it needs cooling. The temperature sensing device 34 is partially located in a convergence space 40, in the form of a cylindrical chamber, in the cartridge body 41 which receives the flow from the hot liquid outlet port 38 in the lower distributing member through a chamber inlet port 42, the perimeter of which is sealingly engaged with the perimeter of the outlet port, such as by seal 43. The temperature sensing device in the regulating state is simply swept by the flow of hot liquid to passing it on its way to eventual exit from the cartridge body. The temperature sensing portion 44 of the temperature sensing device is located in the farther position from the chamber inlet port 42 which means that it can be considered to be "lower" than the chamber inlet port, where the chamber is upright in the cartridge (usually the case in order to minimise the volume occupied by the cartridge).

The piston 47 contacts the inside of a surrounding cap 48 which sealingly but slidably coacts with the temperature sensing device 34. The coacting surfaces are cylindrical. There is preferably a small hole 49 in the cap upper surface so that the hot liquid pressure is always equalized on both sides of the cap. The cap has an outer periphery 50 which sealingly and slidably coacts with a wall 51 of the convergence space 40. The seal between the periphery 50 and wall 51 is preferably effected by means of an "O"-ring 52. The axis of sliding is parallel to that of the cap 48 which for ease of description will be referred to as "upright".

A resilient means, such as a spiral compression spring 53 (shown schematically), holds the lower part or skirt 54 of the cap in sealing engagement with a seat 55 provided at the bottom of the chamber. This seat will usually be circular and have a narrower diameter than that of the chamber wall. For ease of illustration FIG. 5 shows the lower part 54 raised from the seat 55.

As mentioned the temperature sensitive portion 44 of the temperature sensing device is located below the seat 55. One or more orifices 56 through the cap 48, inwards from its periphery 50, allow hot liquid flowing through the chamber 40 to pass freely through, and it thus mingles with any cold liquid which has entered via port 33 and port 61 to wash over the temperature sensing portion 44. The temperature sensing device is selected with a pre-set temperature suitable for the application. There may be a range of temperature sensing devices which could be fitted to any particular cartridge to allow a range of pre-sets.

Should the incoming hot liquid temperature be sensed as being "too hot" then the partial ejection of the piston 47 from the temperature sensing device 34, whose housing is, at this stage, held in a fixed position with respect to the body 41, raises the cap 48 whose periphery 50 slides upwardly in the chamber 40 to, perhaps, the position illustrated in FIG. 5. This is what would normally happen when the valve was first opened while in the "full hot" position with the hot liquid supply temperature above the maximum outflow temperature desired for the cartridge.

However, cold liquid has also been routed from cold liquid inlet port 33 via cold liquid transfer cavity 59 through lower distributing member "first" cold liquid outlet port 60, through passage 61 towards the chamber and it preferably fills a space 62 above the seat 55 but below the "O"-ring 52. It has no access to any flow of hot liquid through the valve body at an acceptable temperature but when a "too hot" condition is reached, such as will usually be the case shortly after the valve has been opened while in a "full hot" position, and the portion 54 becomes unseated, this cold liquid mingles with the "too hot" liquid which has flowed through the orifice(s) 56 to cool it and also to cool the temperature sensing portion 44. An equilibrium position is reached, with appropriate design, where the liquid flowing past the seat 55 is now at the pre-set temperature, or within a small range about the pre-set where there are pressure and/or temperature fluctuations in the incoming liquid supplies. Thus automatic temperature regulation is achieved which can attempt to hold the desired preset maximum emergence temperature even with variations in the pressures and temperatures of the hot and cold supplies. The pressures, however, should be substantially equal.

Assisting in this temperature control is the partial closure of the chamber inlet port 42 by the top of the cap 48 as it is thrust towards the port by the emergent piston 47 and slides upwardly over the housing of the temperature sensing device. This reduces the flow of the "too hot" liquid to improve the temperature sensitivity but the total liquid flow out of the valve can be designed to be fairly constant.

Furthermore the present invention can provide a fail-safe mode of operation should there be no, or an insufficient, supply of cold liquid available to negate a "too hot" situation. In such a situation the temperature sensing device 34 continues to expand until the cap 48 completely closes the chamber inlet port 42. The pressure equalizing hole 49 in the cap assists shut-off by reducing the force needing to be supplied by the temperature sensing device. This also explains why the chamber inlet port is provided. Shut-off against the perhaps noncircular hot liquid outlet port 38 in what might be a fragile lower distributing member 32 would be difficult to achieve.

The second supply of cold liquid to allow manual-control entry enters the outlet 63 at region 64, substantially downstream of the temperature sensing portion 44. The aim is to ensure it does not affect the temperature of the temperature sensing portion, to the maximum extent possible. The cold liquid is channelled there via passage 65 which takes its feed out of the lower distributing member "second" cold liquid outlet port 66 which is fed from cold liquid inlet port 33 via cold liquid transfer cavity 67. From the passage 65 the cold liquid is fed to the perimeter of the cartridge body 41 in a circumferential space 72 between the cartridge and the overlying valve body (an inward facing surface of which is shown in dotted outline at 70). "O"-ring 71 provides one of the seals to such a valve body. From the space 72 there may be a number of perhaps radial passages such as 73 (shown in dotted outline) which feed the cold liquid to a region such as 64. Passages 73 are located so as not to interfere with other passages through the cartridge or valve.

Figure 7:
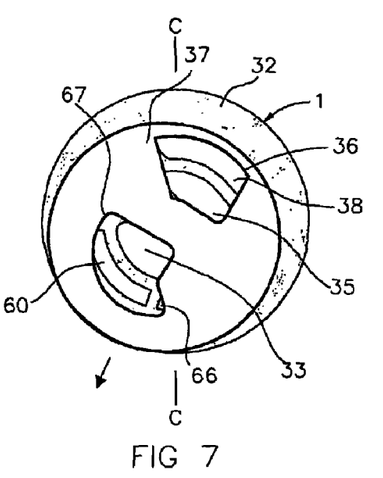
FIG. 7 shows the wide open position where manual over-ride of the pre-set maximum becomes just possible, to allow cooler outflows.
Figure 8:
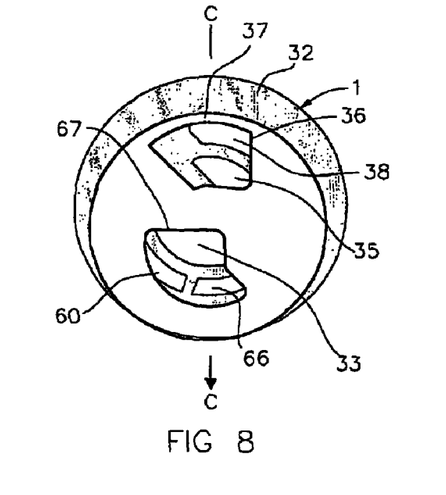
FIG. 8 shows the wide open mid-lever-position where manual over-ride is large and this might be the approximate position assumed for the lower temperature required for a shower, for instance, if the valve is used with water and, FIG. 9 shows the closed position at the mid-lever-position. The upper distributing member can always be closed regardless of the angular position of the handle but in other angular positions of the handle the upper distributing member will assume a different angular orientation with respect to the lower distributing member.
Figure 9:
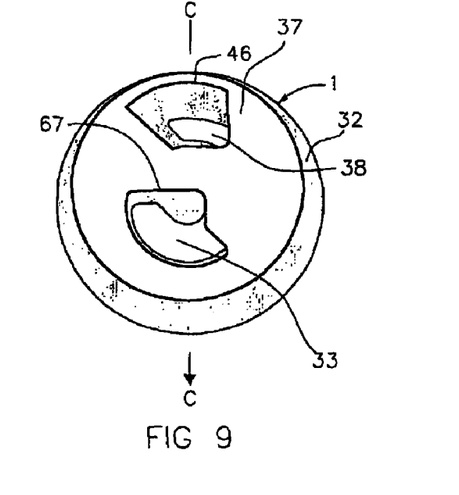

That part of the upper distributing member 37 which may overlie such a cold liquid outlet port 66 is provided with a cold liquid recess 67 such that when the upper distributing member 37 is positioned in any position between about 75% hot (as shown in FIG. 7) or less (FIG. 8); cold liquid from the cold liquid inlet port 33 is also fed, via the recess 67, to the cold liquid outlet port 66. From there it is routed to the region 64 cooling the outflow below the preset temperature. The total liquid flow from the device can be designed to be fairly constant when there is manual over-ride functioning by appropriate port sizing.

Thusfar the temperature sensing device has been described as being held in a fixed position in the cartridge body 41. However, the housing of the temperature sensing device might be arranged to be movable downwardly against a suitable resilience, within the body, when the force of the piston 47 is has caused seating of the cap 48 against the chamber inlet port 42, in order to protect the temperature sensing device and other components of the cartridge. Alternatively with a piston-type temperature sensing device a compressible resilience of suitable strength can be interposed between the piston 47 and the cap 48 or within a telescopic piston, or where the piston interacts with the motive force inside the housing.

The illustrated (FIG. 5) means of protecting the temperature sensing device is to provide a collar 74 on its body, or other suitable means, capable of exerting a downward force on a support member 75.

The support member 75 may normally be pushed upward against a seat 76 in the body 41 by means of a resilience such as a spiral compression spring 77 (shown schematically) of greater strength than spring 53 used to control movement of the cap. It thus normally biases the temperature sensing device housing into a maximum upper position. One or more orifices 78 through the support member 75 mean it does not provide any appreciable barrier to liquid flow. The support member 75 may be a washer with holes through the annulus.

When the supply of cold liquid, at a suitable temperature and pressure, resumes the cold liquid can reach the temperature sensing portion 44 through the radial passage such as 73, if the valve lever is in a position where manual-control is operational, and/or through passage 61, to enable the temperature sensing device to contract, for the support member to reseat and for normal functions to resume.

In an alternative construction the temperature sensing device 34 might be biased upwardly via a compression spring acting directly on its base.

Downward movement of the temperature sensing device when the cap has closed the chamber inlet port is one way of protecting the temperature sensing device from rupture, or other damage to the cartridge. Another way might be to arrange that the housing of the temperature sensing device is capable of expanding when the internal forces get sufficiently high. Or the housing could contain a compressible gas-filled ball. With some arrangements of sufficient strength no protection might be necessary.

The introduction of cold liquid at 64, when the valve lever (not shown) is in a suitable position for manual-control entry, gives manual over-ride of the controlled temperature of the usually mingled hot and cold liquids passing through the support member orifice(s) 78. Thus the automatic temperature regulation regulates the liquids to a safe temperature range while the liquids in that range may be further cooled for user convenience. With the embodiment illustrated in FIGS. 6-9 the range of lever movement would be about 95°.

Devices with Cylindrical Movable Distributing Members

Figures 10, 11:
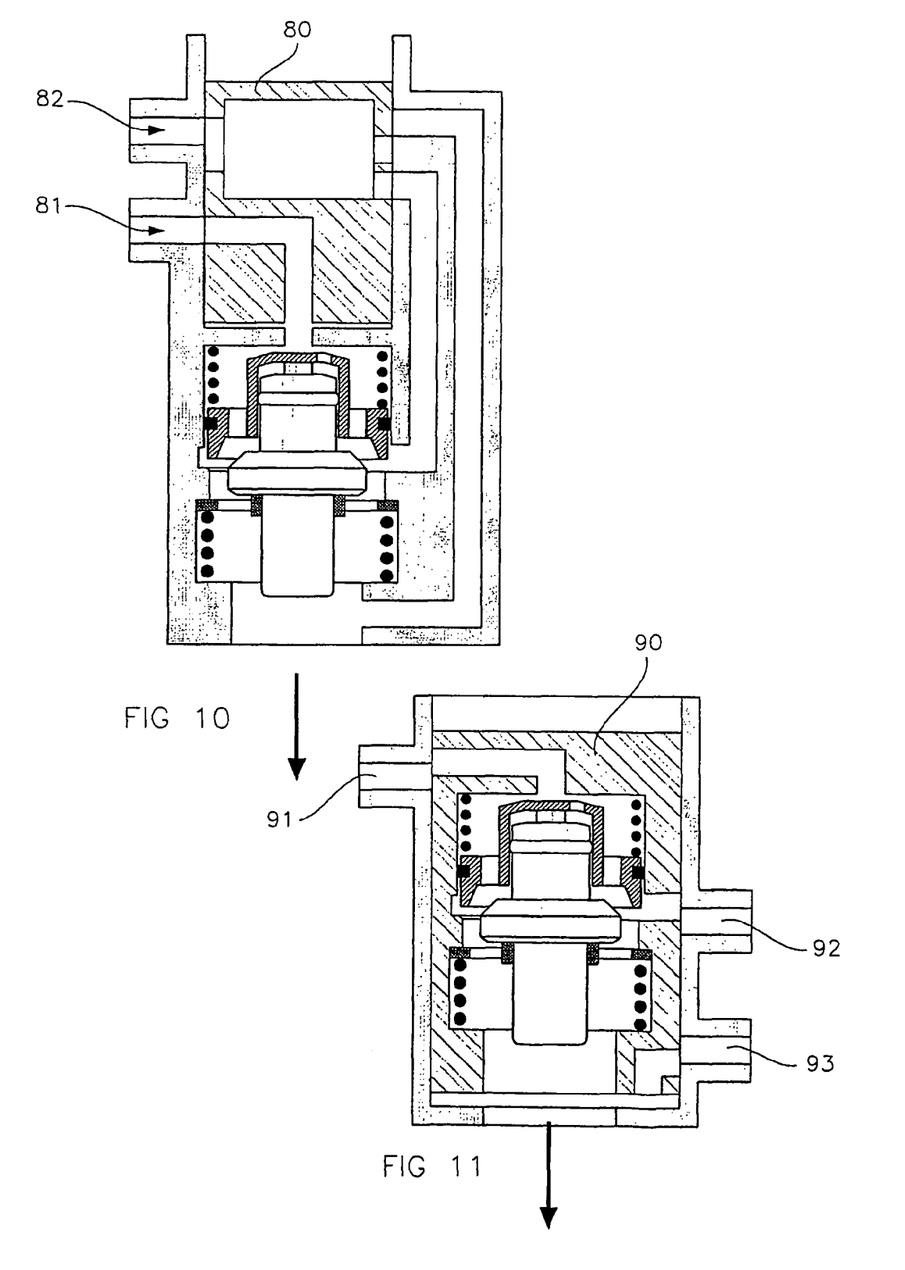
FIGS. 10 and 11 show schematic devices with cylindrical distributing members.

Two examples are shown in FIGS. 10 and 11 which are entirely schematic. In FIG. 10 the cylindrical movable distributing member 80 is rotated for mix adjustment and raised or lowered for flow and on/off control. The hot inlet is 81 and the cold inlet is 82. The cold outlet passages are shown with vertical separation for ease of illustration but they would have angular separation as well/instead of vertical. The temperature sensing device is located in the stationary distributing member.

In FIG. 11 the temperature sensing device is located in the movable distributing member 90 which is a cylindrical. The hot inlet is 91 and there are two cold inlets 92,93.

Advantages

The advantage of the present invention is the means by which safety against a "too hot" condition, such as might cause scalding, is provided for single lever mixing valves. It controls the maximum temperature of the liquids to emerging from the valve. The liquids it will be used with will mostly be water and the installations in which it is used will mostly be domestic, medical or in the hospitality industry. Replacement of a single component—the temperature sensing device—should be all the maintenance required if operation should prove defective. It does away with the need for a tempering valve to control is the maximum flow temperature from a bulk hot liquid reservoir such as a hot water cylinder. It provides individual temperature control at each outlet whose characteristics may be determined by those of the individual temperature sensing devices. Thus temperature sensing devices of different characteristics would allow, say, supply of ablution water at a lower maximum temperature than that supplied to a kitchen sink.

There is complete closure of the hot liquid inlet port 35 and the cold liquid outlet ports 66 and 60 in the lower distributing member when the operating handle is in the "off" or shut or depressed position. This means the temperature sensing device is not under any pressure when the valve is not open and means good sealing is likely to be maintained by the sealing of the distributing members alone using methods proven to be satisfactory over many years of manufacture in successful 3 port valves and cartridges.

A device according to the present invention might frequently be supplied as a cartridge for use in a single lever valve and might have to replace a valve cartridge of a different construction while fitting in the same space. Sometimes the present invention might be incorporated directly into a valve, there being no cartridge as such.

STATEMENTS OF INVENTION

The present invention consists in several aspects which have been set out in the following claims

| Ref | |
|---|---|
| 1 | Stationary distributing member |
| 2 | Sealing portion |
| 3 | Movable distributing member |
| 4 | Body |
| 5 | Hot liquid inlet port |
| 6 | Cold liquid inlet port |
| 7 | "O"-ring |
| 8 | Outlet |
| 9 | "O"-ring |
| 10 | Convergence cavity |
| 11 | Distributing members |
| 12 | Body |
| 13 | |
| 14 | |
| 15 | Hot liquid inlet port |
| 16 | Cold liquid inlet port |
| 17 | |
| 18 | Outlet |
| 19 | |
| 20 | Convergence space |
| 21 | Hot liquid flow |
| 22 | First cold liquid flow |
| 23 | Flow regulating means |
| 24 | Temperature sensing device |
| 25 | Temperature sensing portion |
| 26 | Second cold liquid flow |
| 27 | Location of second cold inlet |
| 28 | Stationary distributing member |
| 29 | Movable distributing member |
| 30 | |
| 31 | |
| 32 | Lower distributing member |
| 33 | Cold liquid inlet port |
| 34 | Temperature sensing device |
| 35 | Hot liquid inlet port |
| 36 | Hot liquid recess |
| 37 | Upper distributing member |
| 38 | Hot liquid outlet port |
| 39 | Flow regulating means |
| 40 | Convergence space |
| 41 | Body |
| 42 | Chamber inlet port |
| 43 | Seal |
| 44 | Temperature sensing portion |
| 45 | |
| 47 | Piston |
| 48 | Cap |
| 49 | Small hole |
| 50 | Outer periphery of 48 |
| 51 | Wall of 40 |
| 52 | "O"-ring |
| 53 | Spring |
| 54 | Skirt of 48 |
| 55 | Seat |
| 56 | Orifice |
| 57 | |
| 58 | |
| 59 | Cold liquid transfer cavity |
| 60 | Cold liquid outlet port |
| 61 | Cold liquid inlet port |
| 62 | Circumferential space |
| 63 | Outlet |
| 64 | Cold liquid inflow region |
| 65 | Cold liquid inlet passage |
| 66 | Second cold liquid outlet port |
| 67 | Cold liquid transfer cavity |
| 68 | |
| 69 | |
| 70 | Body of valve |
| 71 | "O"-ring |
| 72 | Circumferential space |
| 73 | Second cold liquid inlet passage |
| 74 | Collar |
| 75 | Support member |
| 76 | Seat |
| 77 | Spring |
| 78 | Orifice |
| 79 | |

-continued

| Ref | |
|---|---|
| 80 | Movable distributing member |
| 81 | Hot inlet |
| 82 | Cold inlet |
| 83 | |
| 84 | |
| 85 | |
| 86 | |
| 87 | |
| 89 | |
| 90 | Movable distributing member |
| 91 | Hot inlet |
| 92,3 | Cold inlet |

The invention claimed is:

1. A device for mixing and regulating the output temperature of a hot liquid and a cold liquid in a shower, a bath or a faucet, said device comprising:
a mixing chamber;
a hot liquid entry port into said mixing chamber;
a first cold liquid entry port into said mixing chamber;
an outlet from said mixing chamber;
an outlet passage in communication with said outlet of said mixing chamber;
a movable distributing member and a stationary distributing member, the movable distributing member being operable by a single lever to contact proportions of hot and cold liquid introduced to said hot liquid entry port and said first cold liquid entry port;
flow control means within said mixing chamber for simultaneously altering the proportions of hot and cold liquids admitted through said hot liquid entry port and said first cold liquid entry port into said mixing chamber at any rate of combined output flow;
a temperature sensing device adapted to sense the temperature of the output of the mixed liquids from the mixing chamber for controlling the flow control means so that the output temperature at all output flow rates from the mixing chamber does not exceed a selected maximum temperature; and
a second cold liquid entry port in direct fluid communication with the outlet passage of the device downstream from where the temperature of the output flow from the mixing chamber is sensed, movement of the movable distributing member by the single lever further controlling the proportion of cold liquid introduced to said second cold liquid entry port to reduce the output temperature of the output flow from the mixing chamber to below the selected maximum temperature.

2. The device according to claim 1, wherein the stationary distributing member having ports for the supply of hot liquid and cold liquid to the movable distributing member, wherein the movable distributing member regulates the proportions of hot and cold liquid supplied to the hot liquid entry port and to the cold liquid entry ports and the flow rates thereof, and enables complete shut-off of all flows to said ports.

3. The device according to claim 1, further comprising:
a body supporting the movable and stationary distributing members;
sealing means to seal between parts of the movable and stationary distributing members;
wherein the stationary distributing member comprises:
a hot liquid inlet port;
a cold liquid inlet port;
a hot liquid outlet port;
a first cold liquid outlet port;
a second cold liquid outlet port;
and wherein the movable distributing member includes:
a hot liquid transfer cavity;
a cold liquid transfer cavity;
and wherein:
the mixing chamber is a convergence space formed in the body;
the hot liquid entry port is formed in said body and is in direct fluid communication with said hot liquid outlet port and with said convergence space;
the cold liquid entry port is formed in said body and is in direct fluid communication with said first cold liquid outlet port and with said convergence space;
the flow control means is capable of regulating the flow of hot and cold liquids entering said convergence space by opening the hot liquid entry port while closing the first cold liquid entry port and vice versa and is capable of completely closing said hot liquid entry port;
a temperature sensing portion of said temperature sensing device is located in said outlet;
said second entry port for the cold liquid is in direct fluid communication with said second cold liquid outlet port;
and wherein
the movable distributing member is movable to each of the following positions:
a first position where the hot liquid inlet port is in direct fluid communication with the hot liquid transfer cavity which is in direct fluid communication with the hot liquid outlet port and at the same time the cold liquid inlet port is in direct fluid communication with the cold liquid transfer cavity which is in direct fluid communication with the first cold liquid outlet port; or
a second position where the hot liquid inlet port is in direct fluid communication with the hot liquid transfer cavity which is in direct fluid communication with the hot liquid outlet port and at the same time the cold liquid inlet port is in direct fluid communication with the cold liquid transfer cavity which is in direct fluid communication with the first cold liquid outlet port and the cold liquid transfer cavity also is in direct fluid communication with the second cold liquid outlet port; or
a third position where the hot liquid inlet port and the cold liquid inlet port do not communicate with any outlet port.

4. The device according to claim 3, wherein said movable distributing member is movable in an infinitely variable manner between said positions.

5. The device according to claim 4, wherein said movable distributing member is arranged so that, in use, when moved between said first position and said second position, the flow rate from said outlet is maintained when there are substantially equal supply pressures of hot and cold liquids.

6. The device according to claim 5, wherein said movable distributing member is arranged so that, in use, when moved from said first or second positions to said third position, the flow rate from said outlet is reduced.

7. The device according to claim 1, wherein said flow control means is arranged so that, in use, it may be moved into a position effecting complete closure of said first cold liquid entry port.

8. The device according to claim 1, wherein the convergence space has an axis, a cylindrical wall coaxial with said axis and wherein said flow control means includes a movable member capable of moving within a cylindrical mixing chamber defined by said cylindrical wall.

9. The device according to claim 8, wherein said movable member comprises a partition across said cylindrical wall, slidable to and fro along said axis to provide a seal, and wherein an orifice is formed through said partition, said orifice providing communication between said hot and cold entry ports.

10. The device according to claim 9, wherein said first cold liquid entry port communicates with said convergence space via said cylindrical wall and said partition includes a further cylindrical wall which may be positioned over said cold liquid entry port.

11. The device according to claim 10, wherein said further cylindrical wall of said partition is shaped so that it forms a skirt that may be positioned over said cold liquid entry port in a position where the cold liquid entry port is completely closed so that, in use no cold liquid can then enter said convergence space.

12. The device according to claim 9, wherein a hot liquid entry passage communicates with said convergence space at or adjacent an end of said convergence space via said hot liquid entry port.

13. The device according to claim 12, wherein a mixing chamber inlet port is circular in cross-section and is coaxial with said axis.

14. The device according to claim 13, wherein said second cold liquid entry port includes a recess formed in said cylindrical wall lying substantially between surfaces which are normal to said axis.

15. The device according to claim 9, wherein said axis is parallel to an axis about which said movable distributing member may be rotated.

16. The device according to claim 9, wherein said temperature sensing device is arranged within said body so that, in use, the temperature sensing device expands in a direction along said axis on sensing an increase in liquid temperature and contracts along said axis on sensing a decrease in liquid temperature.

17. The device according to claim 16, wherein said temperature sensing device includes a housing and a piston capable of expanding and contracting and thereby being moved axially to and fro with respect to said housing, coaxially with said axis.

18. The device according to claim 17, wherein said piston is positioned so that it can directly contact said partition.

19. The device according to claim 18, further comprising a resilient bias which biases said partition and said piston towards the most contracted position of the piston of the temperature sensing device.

20. The device according to claim 19, wherein said resilient bias is a compression spring located between said mixing chamber inlet port and said partition.

21. The device according to claim 20, wherein said partition is cupped and said spring partially surrounds said piston.

22. The device according to claim 16, further comprising means for protecting said temperature sensing device, said protecting means preventing pressure above a pre-determined maximum pressure from developing within said housing.

23. The device according to claim 22, wherein said temperature sensing device is located in said body so that it is movable along said axis and said body is provided with a seat, and wherein said protecting means includes a second resilient bias which biases movement of said temperature sensing device relative to said body against expansion of said piston, said second resilient bias acting to locate said temperature sensing device against said seat, so that when a pressure within said mixing chamber exceeds a pre-determined maximum pressure said temperature sensing device moves against the action of said second resilient bias thereby moving away from said seat.

24. The device according to claim 3, wherein the movable distributing member and the stationary distributing member each comprise ceramic discs.

25. The device according to claim 3, wherein the movable distributing member has a convex spherical surface and the stationary distributing member has a concave spherical surface.

26. The device according to claim 3, wherein the movable distributing member has a convex cylindrical surface and the stationary distributing member has a concave cylindrical surface.

27. The device according to claim 1 wherein the device is in the form of a cartridge for a valve.

28. The device according to claim 1, wherein the device is a valve and the valve further comprises a single operating lever.

29. The device according to claim 1, further comprising:
a body supporting the movable and stationary distributing members;
sealing means to seal between parts of the movable and stationary distributing members;
wherein the stationary distributing member includes:
a hot liquid inlet port;
a cold liquid inlet port;
and wherein the movable distributing member includes:
a hot liquid transfer cavity;
a cold liquid transfer cavity;
and wherein the device further comprises the following, all wholly or partly contained in the body, or all wholly or partly contained in the moveable distributing member, or all wholly or partly contained in the stationary distributing member:
said mixing chamber is a convergence space;
said hot liquid entry port is in direct fluid communication with said hot liquid transfer cavity and with said convergence space;
said cold liquid entry port is in direct fluid communication with said cold liquid transfer cavity and with said convergence space;
and wherein:
said flow control means is located within said convergence space and is capable of regulating the flow of hot and cold liquids entering said convergence space by opening the hot liquid entry port while closing the first cold liquid entry port and vice versa and is capable of effecting complete closure of said hot liquid inlet port;
a temperature sensing portion of said temperature sensing device is located in said outlet;
said second entry port for the cold liquid is in direct fluid communication with said cold liquid transfer cavity; and wherein
the movable distributing member is movable to each of the following positions:
a first position where the hot liquid inlet port is in direct fluid communication with the hot liquid transfer cavity which is in direct fluid communication with the hot liquid outlet port and at the same time the cold liquid inlet port is in direct fluid communication with the cold liquid transfer cavity which is in direct fluid communication with the first cold liquid outlet port; or
a second position where the hot liquid inlet port is in direct fluid communication with the hot liquid transfer cavity which is in direct fluid communication with the hot liquid outlet port and at the same time the cold liquid inlet port is in direct fluid communication with the cold liquid transfer cavity which is in direct fluid communication with the first cold liquid outlet port and the cold liquid transfer cavity also is in direct fluid communication with the second cold liquid outlet port; or a third position where the hot liquid inlet port and the cold liquid inlet port do not communicate with each other and block communication from both said hot liquid inlet port and said cold liquid inlet port with any outlet.

30. A method of mixing and hot and cold liquid and regulating the temperature of the mixture in a shower, a bath or a faucet, the method comprising the steps of:

providing hot liquid into a mixing chamber via a hot liquid entry port;

providing cold liquid into the mixing chamber via a cold liquid entry port;

providing an outlet from said mixing chamber;

providing an outlet passage in direct fluid communication with said outlet of said mixing chamber;

altering the proportion of hot to cold liquid admitted through said hot liquid entry port and said cold liquid entry port into said mixing chamber at any rate of combined output flow with a flow control means within said mixing chamber;

sensing the temperature of an output of the mixed liquids from the mixing chamber with a temperature sensing device and controlling the flow control means so that an output temperature at all output flow rates from the mixing chamber does not exceed a selected maximum; and introducing cold liquid into said outlet passage of said mixing chamber via a second entry port controlled by the flow control means downstream from where the temperature of the output flow from the mixing chamber is sensed to reduce the output temperature of the output flow from the mixing chamber to below the selected maximum temperature.

\* \* \* \* \*

UNITED STATES PATENT AND TRADEMARK OFFICE
CERTIFICATE OF CORRECTION

PATENT NO.       : 8,376,241 B2                                          Page 1 of 1
APPLICATION NO.  : 10/573417
DATED            : February 19, 2013
INVENTOR(S)      : Green et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 734 days.

Signed and Sealed this

First Day of September, 2015

Michelle K. Lee
*Director of the United States Patent and Trademark Office*